(12) United States Patent
Gordon et al.

(10) Patent No.: US 8,925,870 B1
(45) Date of Patent: Jan. 6, 2015

(54) MORPHING WING LEADING EDGE

(75) Inventors: Jason Gordon, Long Beach, CA (US);
Carl Borgstrom, Boulder, CO (US);
Noah Fisher, Denver, CO (US); Cory Fuhrmeister, Boulder, CO (US);
Nathan Madigan, Boulder, CO (US);
Carly Parkins, Hanahan, SC (US)

(73) Assignee: The Boeing Company, Chicago, IL (US)

(*) Notice: Subject to any disclaimer, the term of this patent is extended or adjusted under 35 U.S.C. 154(b) by 329 days.

(21) Appl. No.: 13/417,201

(22) Filed: Mar. 9, 2012

(51) Int. Cl.
*B64C 21/10* (2006.01)

(52) U.S. Cl.
USPC .......................... 244/200; 244/214; 244/219

(58) Field of Classification Search
USPC .......................... 244/200, 214, 219
See application file for complete search history.

(56) References Cited

U.S. PATENT DOCUMENTS

| | | | |
|---|---|---|---|
| 2,749,060 A | 6/1956 | Brady | |
| 2,763,448 A | 9/1956 | Davie | |
| 3,244,384 A | 4/1966 | Bracka | |
| 3,556,439 A | 1/1971 | Baumgaertner | |
| 3,941,334 A | 3/1976 | Cole | |
| 3,994,451 A | 11/1976 | Cole | |
| 3,994,452 A * | 11/1976 | Cole | 244/214 |
| 4,040,579 A | 8/1977 | McKinney | |
| 4,113,210 A | 9/1978 | Pierce | |
| 4,159,089 A | 6/1979 | Cole | |
| 4,171,787 A | 10/1979 | Zapel | |
| 4,200,253 A | 4/1980 | Rowarth | |
| 4,252,287 A | 2/1981 | Zimmer | |
| 4,262,868 A | 4/1981 | Dean | |
| 4,349,169 A * | 9/1982 | McAnally | 244/219 |
| 4,351,502 A * | 9/1982 | Statkus | 244/219 |
| 4,360,176 A | 11/1982 | Brown | |
| 4,427,168 A | 1/1984 | McKinney | |
| 4,429,844 A | 2/1984 | Brown et al. | |
| 4,468,014 A | 8/1984 | Strong | |
| 4,553,722 A * | 11/1985 | Cole | 244/219 |
| 4,585,192 A | 4/1986 | Clifford-Jones | |
| 4,650,140 A | 3/1987 | Cole | |
| 4,706,913 A * | 11/1987 | Cole | 244/214 |
| 5,158,252 A | 10/1992 | Sakurai | |
| 5,590,854 A * | 1/1997 | Shatz | 244/206 |
| 5,879,767 A | 3/1999 | Matsushima | |
| 6,375,126 B1 | 4/2002 | Sakurai | |
| 6,796,534 B2 * | 9/2004 | Beyer et al. | 244/214 |
| 7,114,879 B2 | 10/2006 | Obermeyer | |
| 7,716,958 B2 | 5/2010 | Martin | |
| 7,798,443 B2 | 9/2010 | Hamilton et al. | |
| 8,042,772 B2 | 10/2011 | Lutke | |
| 8,256,719 B2 * | 9/2012 | Wood et al. | 244/200 |
| 8,342,447 B2 | 1/2013 | Etling | |
| 8,366,057 B2 * | 2/2013 | Vos et al. | 244/219 |
| 8,678,324 B2 * | 3/2014 | Hemmelgarn et al. | 244/219 |
| 2002/0100406 A1 * | 8/2002 | Costa et al. | 114/102.22 |
| 2005/0056731 A1 * | 3/2005 | Hamilton et al. | 244/219 |

* cited by examiner

*Primary Examiner* — Christopher P Ellis

(57) ABSTRACT

A wing may include a flexible leading edge skin segment having segment ends positioned adjacent to upper and lower leading edge wing skins to form a skin assembly. The upper leading edge wing skin may be positioned between the leading edge skin segment and an upper main wing skin. The lower leading edge wing skin may be positioned between the leading edge skin segment and a lower main wing skin. The wing may include a deployment device configured to flex the upper and lower leading edge wing skins thereby causing the leading edge skin segment to exhibit a rolling motion.

20 Claims, 12 Drawing Sheets

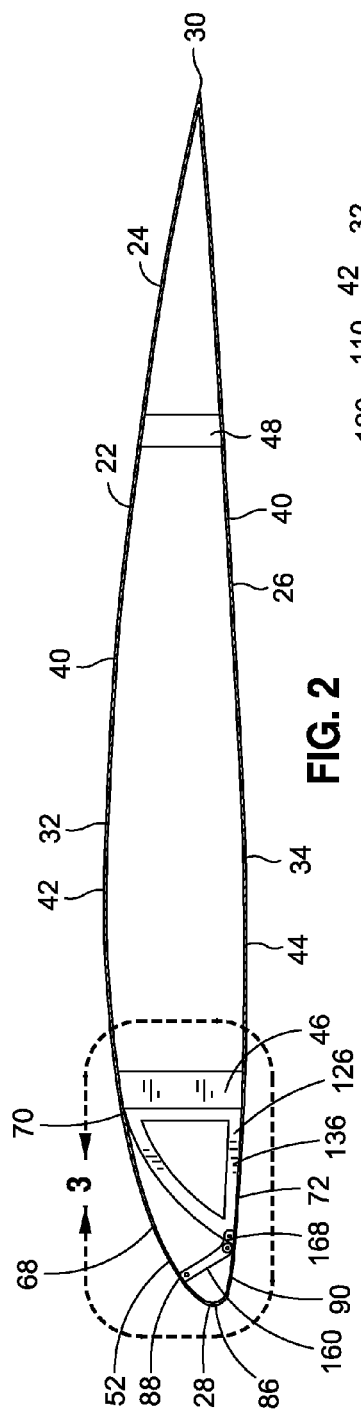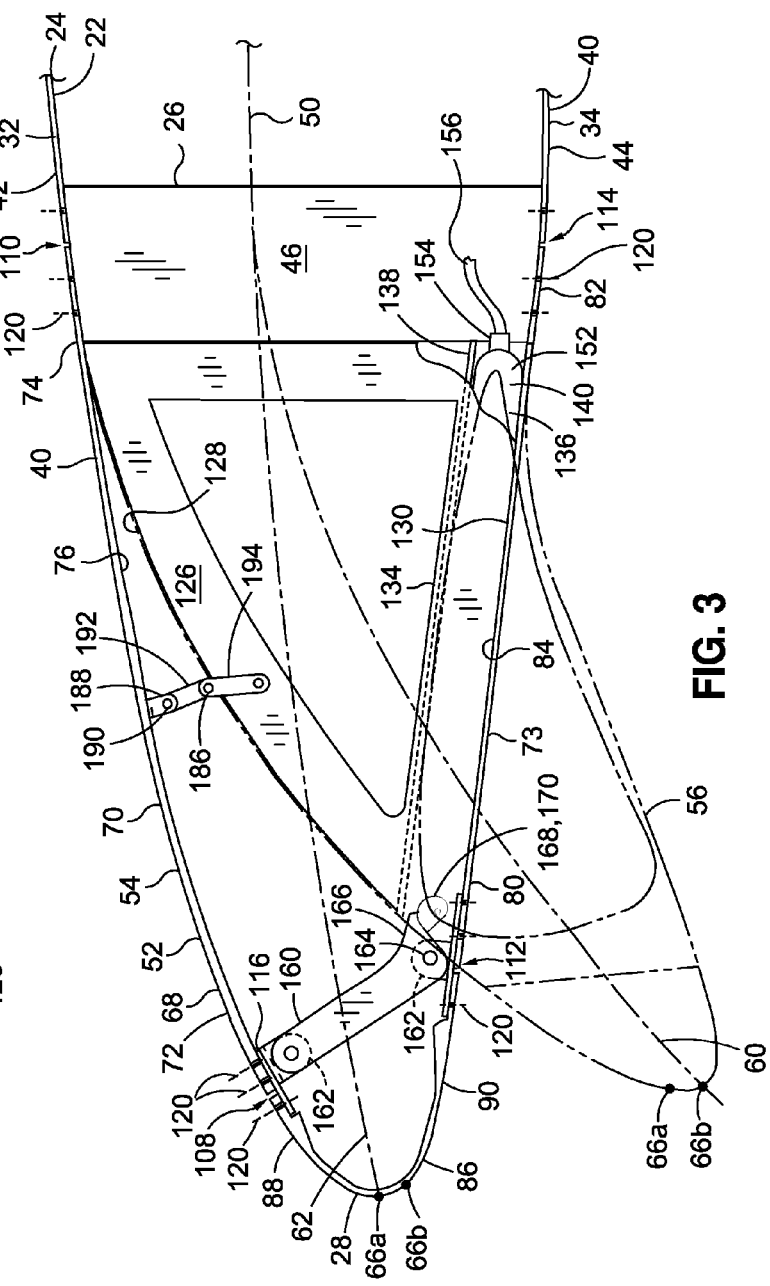

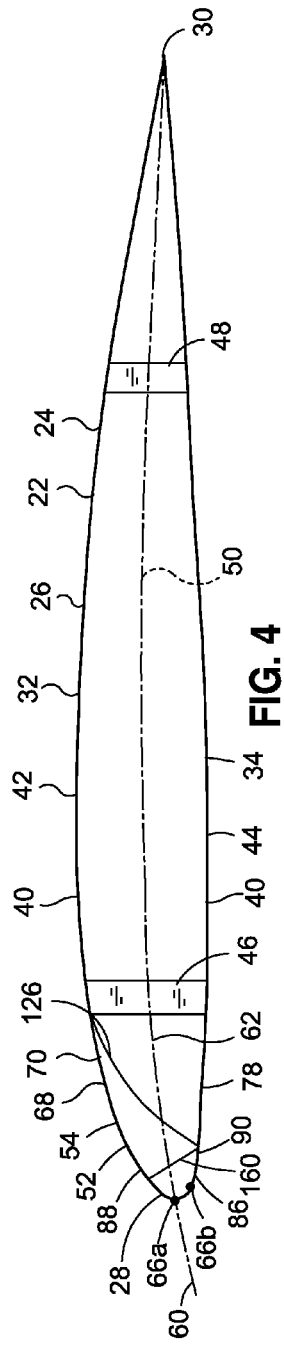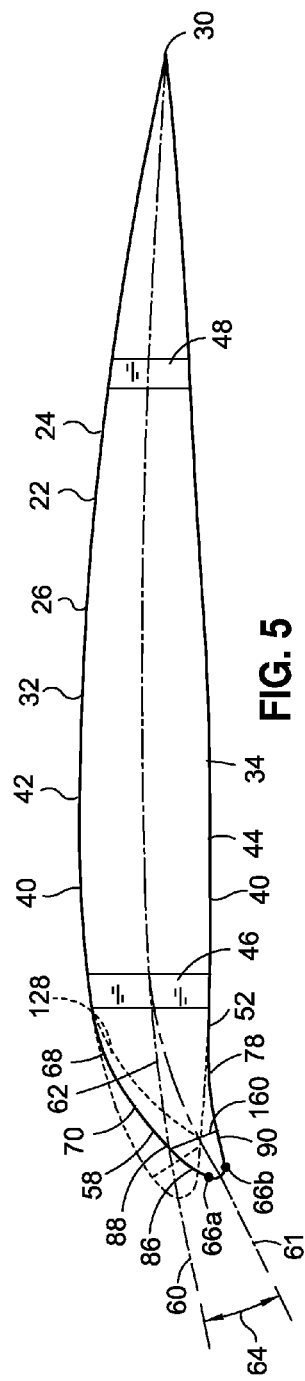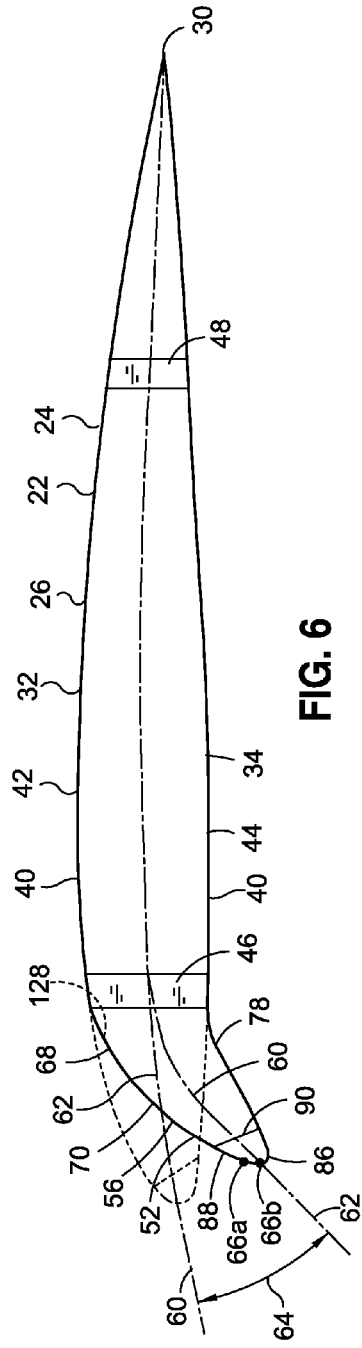

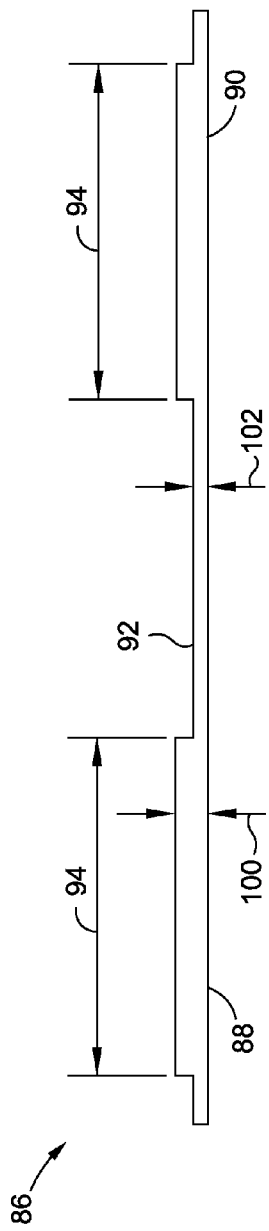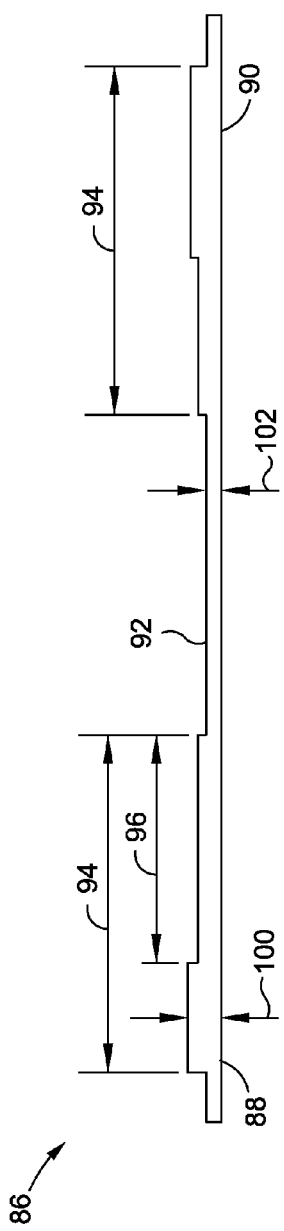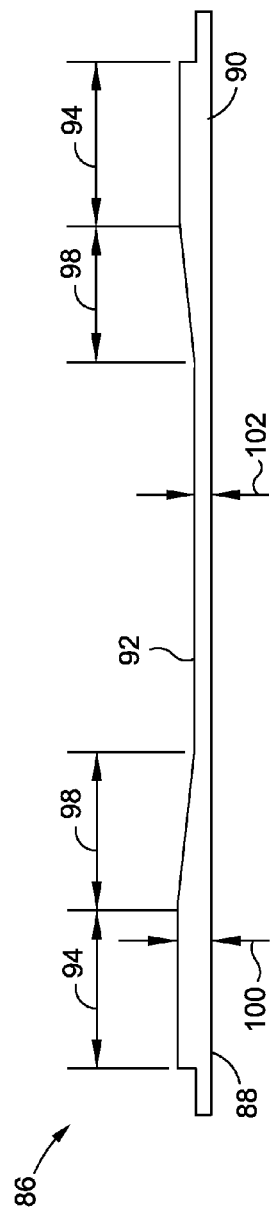

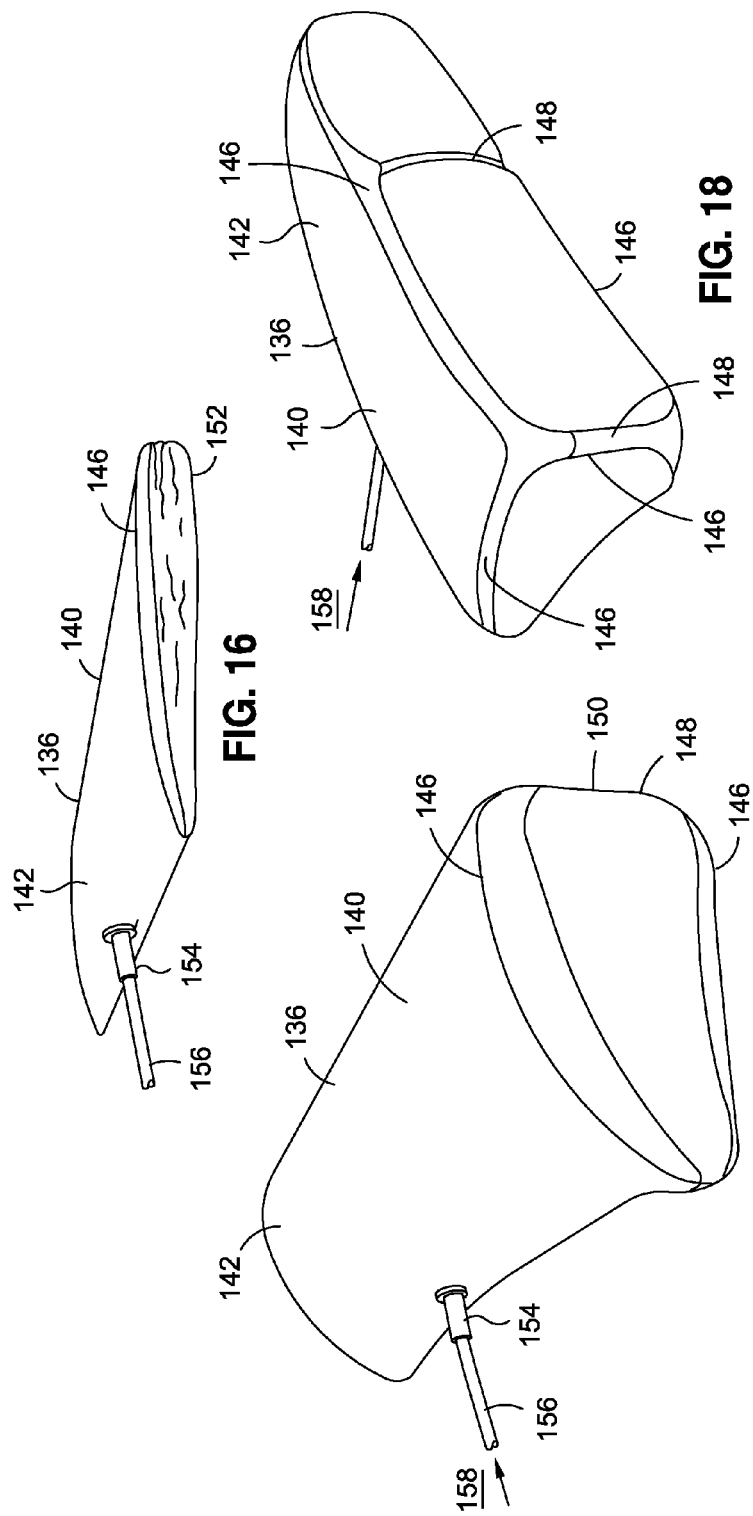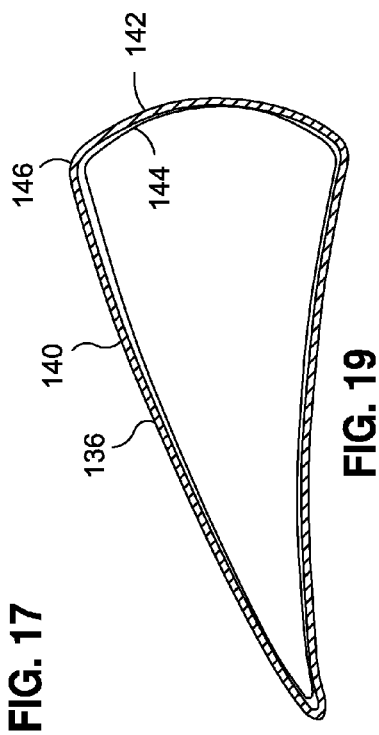

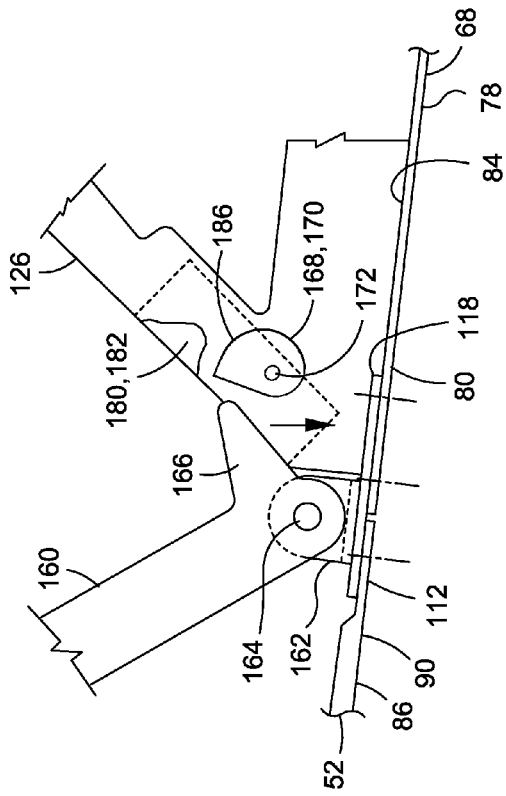
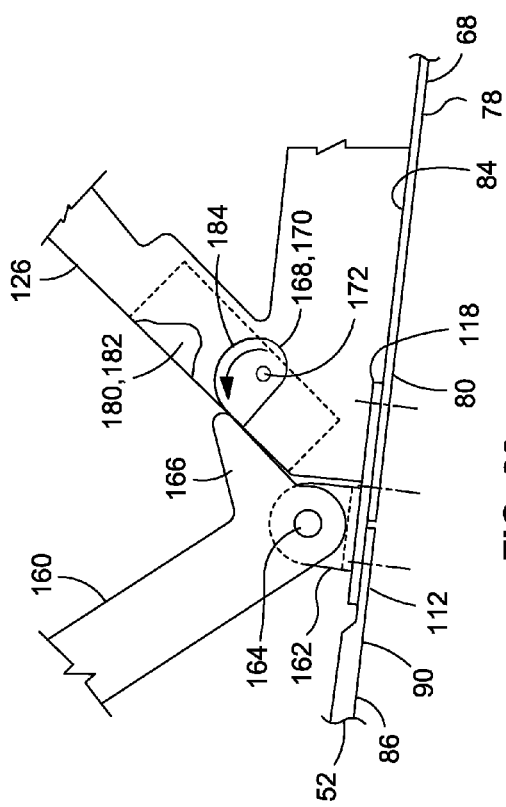

MORPHING WING LEADING EDGE

FIELD

The present disclosure relates generally to aerodynamics and, more particularly, to devices for manipulating the leading edge of an airfoil.

BACKGROUND

Aircraft noise pollution is a significant environmental problem for communities near airports. A large portion of the noise produced by an aircraft during the approach and landing phase of a flight is generated by the airframe. Such approach noise is generally the result of air flowing over and around the airframe components such as over the landing gear and over devices that may be deployed from the aircraft wings. Such devices may include flaps mounted to the trailing edges of the wings and conventional slats or flaps (e.g., Krueger flaps) mounted to the wing leading edges and which may be deployed or deflected downwardly from the wings during approach and landing. By deploying the flaps or slats, airflow may be maintained over the wings at high angles of attack, which may allow for a reduction in the approach and landing speed of the aircraft and/or an increase in the descent angle of the aircraft.

The noise generated by conventional leading edge devices such as conventional slats or flaps may be attributed to turbulence created by sharp edges of the deployed devices. The noise may also be attributed to turbulence generated by air flowing through gaps in the deployed devices or gaps between the wings and the deployed devices. Furthermore, turbulence associated with conventional slats and flaps may cause vibration and flutter in the slats or flaps, which, over time, may have an undesirable effect on the actuating mechanisms for deploying the flaps or slats.

As can be seen, there exists a need in the art for a leading edge device of an airfoil, such as an aircraft wing, which generates a reduced amount of airframe noise when the leading edge device is deployed. In this regard, there exists a need in the art for a leading edge device for an airfoil that generates a reduced amount of turbulence when the leading edge device is deployed.

SUMMARY

The above-noted needs associated with conventional slats and flaps are specifically addressed by the present disclosure which provides a leading edge device which may be mounted to or integrated with a wing or other airfoil. The leading edge device may include a skin assembly and a deployment device. The skin assembly may include an upper leading edge wing skin and a lower leading edge wing skin each having a forward end and an aft end. The aft ends of the upper and lower leading edge wing skins may be fixedly or rigidly coupled to a main wing structure of the wing. The skin assembly may further include a leading edge skin segment having upper and lower ends respectively connected to the upper and lower leading edge wing skin at the forward ends. The deployment device may be configured to flex the upper and lower leading edge wing skins and cause rolling motion of the leading edge skin segment during movement of the skin assembly between an undeployed position and a deployed position.

In a further embodiment, disclosed is a wing having a main wing structure. At least two ribs may be mounted to the main wing structure in spaced relation to one other. Each rib may have a rib upper surface and a rib lower surface. The wing may include a skin assembly having a flexible upper and lower leading edge wing skin each having a forward end and an aft end. The aft ends may be fixedly coupled to the main wing structure. The wing may further include a flexible leading edge skin segment interconnecting the upper and lower leading edge wing skins. The wing may also include a deployment device configured to flex the upper and lower leading edge wing skins and cause rolling motion of the leading edge skin segment to move the skin assembly from an undeployed position toward a deployed position in a manner increasing a camber of the wing. The lower leading edge wing skin may be placed in substantial contact with the rib lower surface when the skin assembly is in the undeployed position. The upper leading edge wing skin may be placed in substantial contact with the rib upper surface when the skin assembly is in the deployed position.

Also disclosed is a method of morphing a leading edge of an airfoil. The method may include the step of operating a deployment device positioned between a skin assembly and a main wing structure. The method may further include causing an upper and lower leading edge wing skin of the skin assembly to flex and move between an undeployed position and a deployed position. The method may additionally include changing a camber angle of the wing during movement of the skin assembly.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a cross section of a wing taken along line 2 of FIG. 1 and illustrating an embodiment of a leading edge device mounted to a forward end of a main wing structure of the wing;

FIG. 3 is a cross-sectional view of the leading edge device taken along line 3 of FIG. 2 and illustrating a skin assembly of the leading edge device in an undeployed position and in a deployed position;

FIG. 4 is a cross-sectional view of the wing illustrating a mean camber line of the wing and an undeployed camber line of the leading edge device in an undeployed position;

FIG. 5 is a cross-sectional view of the wing illustrating an intermediate camber line of the leading edge device in an intermediate position;

FIG. 6 is a cross-sectional view of the wing illustrating a deployed camber line of the leading edge device in a deployed position;

FIG. 11 is a cross-sectional view of a thickness profile of the leading edge skin segment in an embodiment;

FIG. 12 is a cross-sectional view of a thickness profile leading edge skin segment in a further embodiment;

FIG. 13 is a cross-sectional view of a thickness profile leading edge skin segment in another embodiment;

FIG. 16 is a perspective illustration of an embodiment of the airbag in a deflated position;

FIG. 17 is a perspective illustration of the airbag in an inflated position;

FIG. 18 is a further perspective illustration of the airbag in the inflated position;

FIG. 19 is a cross-sectional view of an embodiment of the airbag;

FIG. 20 is a side view of an embodiment of a locking mechanism comprising a locking cam engaging the nose linkage in a locking position;

FIG. 21 is a side view of the locking mechanism wherein the locking cam is in an unlocked position allowing the skin assembly to move toward the deployed position.

DETAILED DESCRIPTION

Figure 1:
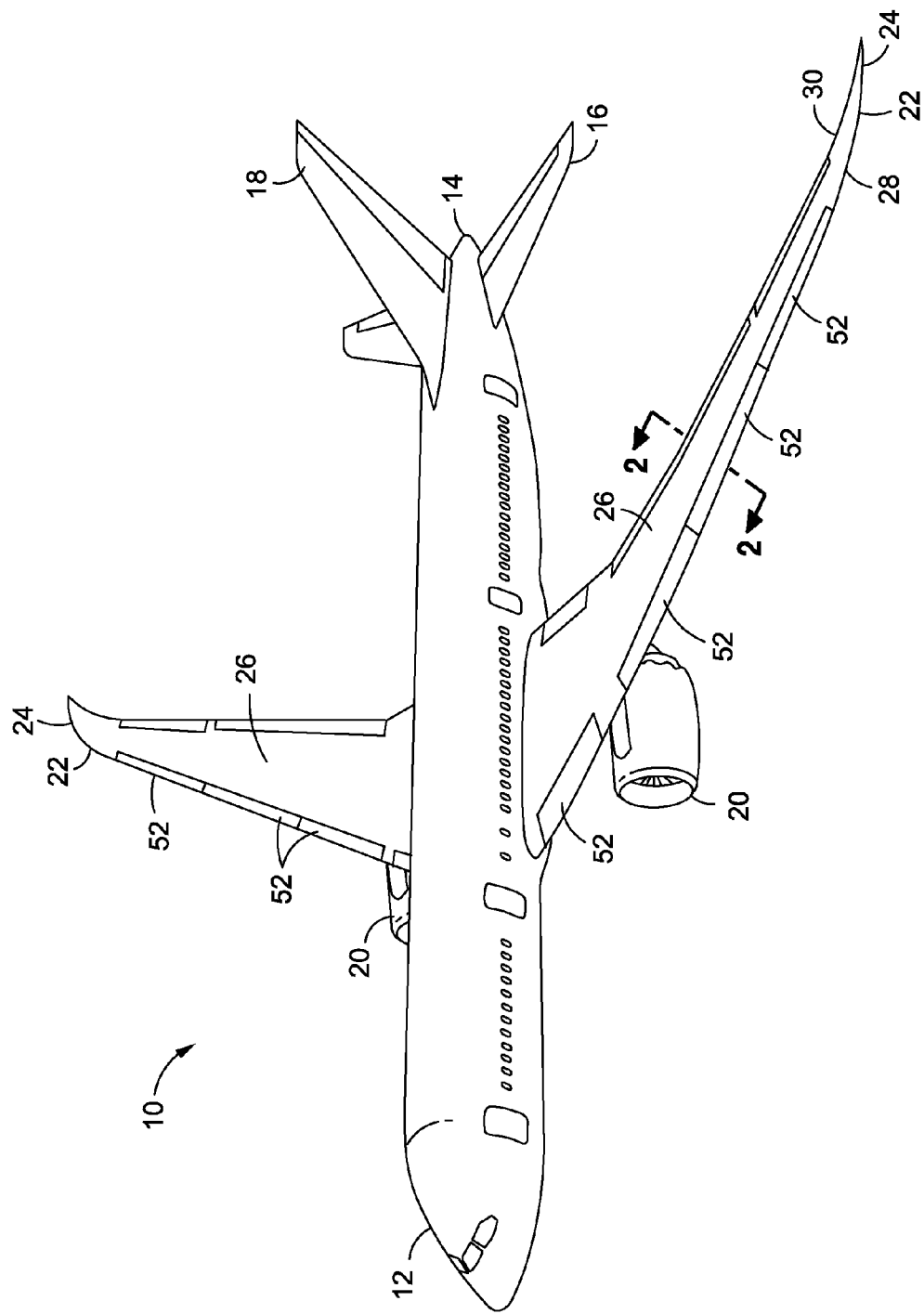
FIG. 1 is a perspective illustration of an aircraft.

Referring now to the drawings wherein the showings are for purposes of illustrating preferred and various embodiments of the disclosure, shown in FIG. 1 is a perspective illustration of an aircraft 10 which may incorporate one or more leading edge devices 52 in various embodiments as disclosed herein. The aircraft 10 may include a fuselage 12 having an empennage 14 which may include a horizontal stabilizer 16 and a vertical stabilizer 18. The aircraft 10 may further include a pair of wings 22 extending outwardly from the fuselage 12 and one or more propulsion units 20 mounted to the wings 22.

In FIG. 2, shown is a cross section of a wing 22 of the aircraft 10. The wing 22 includes a leading edge 28 and a trailing edge 30 and further includes an upper main skin 32 and a lower main wing skin 34 respectively defining a wing upper surface 42 and a wing lower surface 44. The wing upper surface 42 and wing lower surface 44 define an outer mold line 40 of the wing 22. The wing 22 is shown as having a main wing structure 26 which may include a forward spar 46 and a rear spar 48. However, the wing 22 may include one or more additional spars and is not limited to having a forward spar 46 and a rear spar 48. In this regard, the leading edge device 52 as disclosed herein may be implemented for use in a wing 22 of any configuration and is not limited to the configuration shown in FIG. 2. Further in this regard, the leading edge device 52 may be implemented in any airfoil 24 for use in any vehicular or non-vehicular application, without limitation, and is not limited to implementation on an aircraft 10.

In FIG. 3, shown is an embodiment of the leading edge device 52. The leading edge device 52 may include a skin assembly 68 and a deployment device 136. The leading edge device 52 may further include one or more ribs 126 mounted to the main wing structure 26 of the wing 22. The skin assembly 68 may include an upper leading edge wing skin 70 and a lower leading edge wing skin 78 which may be interconnected by a leading edge skin segment 86. Each one of the upper and lower leading edge wing skins 70, 78 may include a forward end 72, 80 and an aft end 74, 82. The aft end 74 of the upper leading edge wing skin 70 may be positioned adjacent to or coupled to the upper main wing skin 32. For example, the upper leading edge wing skin 70 may be disposed in abutting contact with the upper main wing skin 32. Likewise, the aft end 82 of the lower leading edge wing skin 78 may be positioned adjacent to, coupled to, and/or disposed in abutting contact with the lower main wing skin 34.

The leading edge skin segment 86 may include a segment upper end 88 and a segment lower end 90. The leading edge device 52 may include a nose linkage 160 for coupling the segment upper end 88 to the segment lower end 90. The segment upper end 88 may be positioned adjacent to or connected to the forward end 72 of the upper leading edge wing skin 70. Likewise, the segment lower end 90 may be positioned adjacent to or connected to the forward end 80 of the lower leading edge wing skin 78.

It should be noted that although the skin assembly 68 is described as being comprised of three individual components, namely, the upper leading edge wing skin 70, the lower leading edge wing skin 78, and the leading edge skin segment 86, it is contemplated that the skin assembly 68 may be configured as a unitary structure (not shown) combining the upper and lower leading edge wing skins 70, 78 and the leading edge skin segment 86 and having mechanical properties that provide the skin assembly with the desired flexing capability in the chordwise direction and causing the leading edge skin segment 86 to exhibit a rolling motion as described below. In addition, such a unitary skin assembly may additionally include a level of spanwise stiffness allowing the unitary skin assembly to sustain flight loads and minimize vibration and deflection when the leading edge device 52 is in the undeployed position 54 and/or in the deployed position 56.

As shown in FIG. 3, the skin assembly 68, collectively defined by the upper and lower leading edge wing skins 70, 78 and the leading edge skin segment 86, may be moved from an undeployed position 54 toward a deployed position 56 by means of a deployment device 136. In an embodiment, the deployment device 136 may comprise an airbag 140 which may be inflated in order to apply downward pressure to the lower leading edge wing skin 78. In this regard, inflation of the airbag 140 may cause flexing or bending of the upper and lower leading edge wing skins 70, 78. The skin assembly 68 may be deflected downwardly from the undeployed position 54 (shown in solid) to the deployed position 56 (shown in phantom). The skin assembly 68 may be the deflected downwardly until the inner skin surface 76 of the upper leading edge wing skin 70 comes into substantial contact with at least a portion of the rib upper surface 128 of one or more ribs 126 that may be included with the leading edge device 52. The upper leading edge wing skin 70 may assume the shape of the rib upper surface(s) 128 when the skin assembly 68 comes into substantial contact with the rib upper surface(s) 128 such as when the skin assembly 68 is in the deployed position 56.

Advantageously, when the skin assembly 68 is moved to the deployed position 56, the leading edge device 52 provides increased camber to the wing 22 with a high degree of flow turning. Furthermore, the leading edge device 52 is configured such that the high degree of flow turning is advantageously provided with no gaps or sharp edges protruding from the leading edge device 52 or from the airfoil 24. In this manner, the leading edge device 52 minimizes or reduces aerodynamic noise due to turbulence generated by conventional leading edge slats or flaps. The leading edge device 52 as disclosed herein provides a substantially continuous, smooth outer mold line 40 surface along the airfoil 24 due to the uninterrupted transition of the upper leading edge wing skin 70 to the upper main wing skin 32 and the uninterrupted transition of the lower leading edge wing skin 78 to the lower main wing skin 34 as shown in FIG. 3 and described in greater detail below. The leading edge device 52 advantageously minimizes aerodynamic turbulence when the leading edge device 52 is deployed and the airfoil 24 is oriented at high angles of attack.

Referring to FIGS. 3-4, the wing 22 includes a mean camber line 50 extending from the leading edge 28 of the wing 22 toward the trailing edge 30 (FIG. 4) of the wing 22. The mean camber line 50 may be located midway between the wing upper surface 42 and the wing lower surface 44. As shown in FIG. 3, the leading edge device 52 may define an undeployed camber line 62 and a deployed camber line 60. For purposes of illustrating the rolling motion of the leading edge skin segment 86, the intersection of the undeployed camber line 62 with the leading edge 28 is defined as a first reference point 66a. The intersection of the deployed camber line 60 with the leading edge 28 is defined as a second reference point 66b.

In FIG. 4, shown is a cross section of the wing 22 with the leading edge device 52 attached to the main wing structure 26 of the wing 22. The leading edge device 52 is shown in an undeployed position 54 and the first reference point 66a located at a substantially forward-most point of the wing 22 at the intersection of the undeployed camber line 60 with the leading edge 28. The second reference point 66b is located on the leading edge 28 below the first reference point 66a.

In FIG. 5, shown is a cross section of the wing 22 with the leading edge device 52 in an intermediate position 58. The upper leading edge wing skin 70 and lower leading edge wing skin 78 of the leading edge device 52 are flexed downwardly under the influence of the deployment device (not shown). In the intermediate position 58, the upper leading edge wing skin 70 is disposed in spaced relation to the rib upper surface 128 shown in phantom. Likewise, the lower leading edge wing skin 78 is disposed in spaced relation to the rib lower surface 130. The leading edge 28 (FIG. 4) defines an intermediate camber line 61. The intermediate camber line 61 defines a camber angle 64 relative to the camber line 62 of the undeployed leading edge 28.

The leading edge skin segment 86 on the forward end of the leading edge device 52 undergoes a rolling motion as the upper leading edge wing skin 70 and lower leading edge wing skin 78 flex downwardly. The boundaries of the leading edge skin segment 86 in FIG. 5 may be defined by the nose linkage 160 which couples the segment lower end 90 of the leading edge skin segment 86 to the segment upper end 88 of the leading edge skin segment 86. The rolling motion of the leading edge skin segment 86 may be characterized by movement of the first and second reference point 66a, 66b along the surface of the leading edge skin segment 86. In FIG. 5, the first and second reference point 66a, 66b are located on opposite sides of the intermediate camber line 61.

In FIG. 6, shown is the leading edge device 52 in a final deployed position 56. The upper and lower leading edge wing skins 70, 78 are deflected downwardly to a greater extent relative to the downward deflection shown in FIG. 5. In FIG. 6, the upper leading edge wing skin 70 is in substantial=contact with the rib upper surface 128. The deployed camber line 60 defines a larger camber angle 64 relative to the camber angle 64 shown in FIG. 5. In FIG. 6, the second reference point 66b is located at the intersection of the deployed camber line 62 with the leading edge 28 (FIG. 4) and the first reference point 66a is further away from the deployed camber line 62 relative to the location of the first reference point 66a in FIG. 5. In an embodiment, the leading edge device 52 may be configured to provide an increase in camber of at least approximately 20° of camber angle 64 when the skin assembly 68 is in the deployed position 56. However, the leading edge device 52 may be configured to provide an increase in camber angle 64 of greater than approximately 20°. Advantageously, the wing 22 has a substantially continuous outer mold line 40 along the wing upper and lower surfaces 42, 44 as the skin assembly 68 is moved between the undeployed position 54 and the deployed position 56 as shown in FIGS. 4-6.

Figure 7:
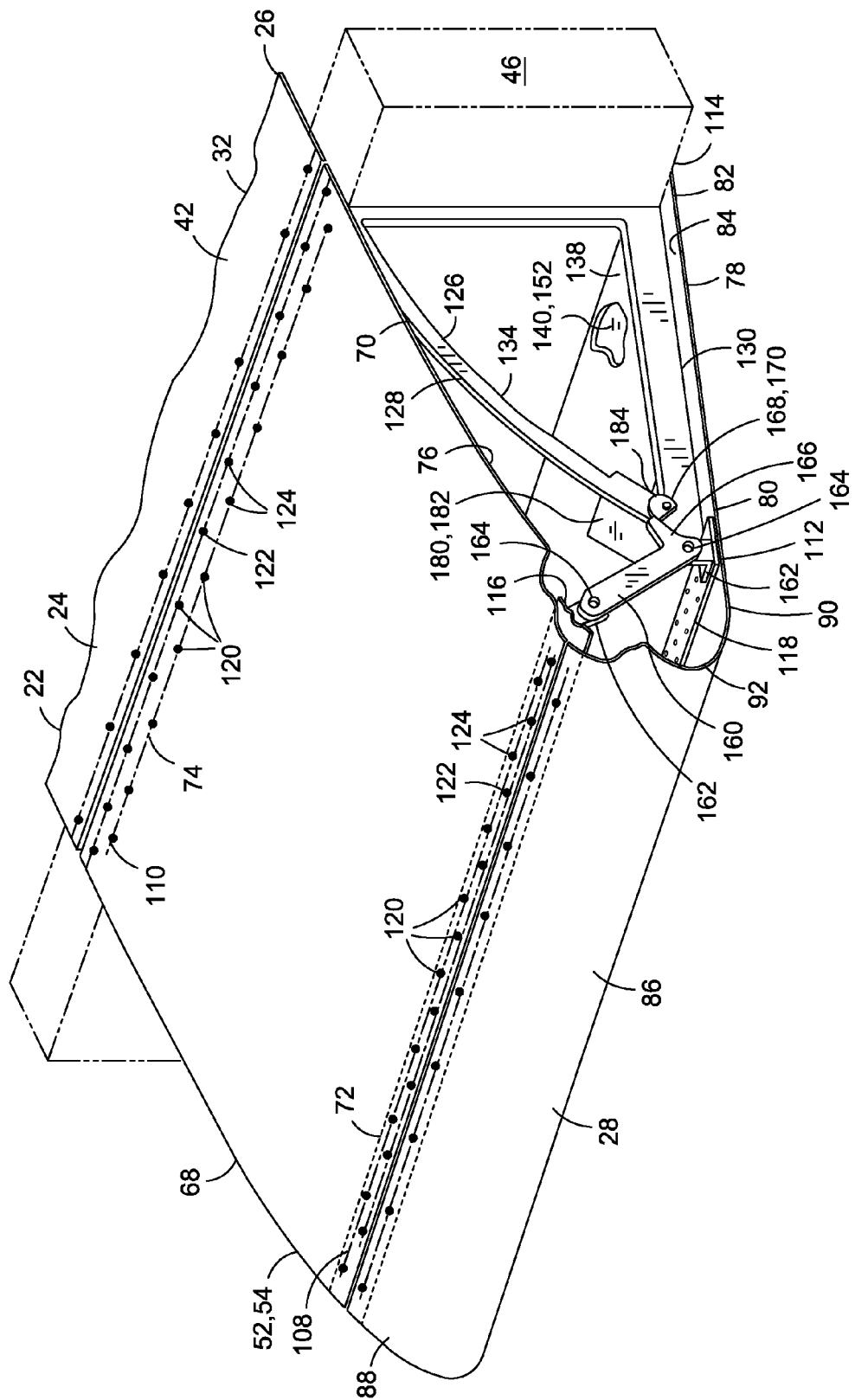
FIG. 7 is a perspective view of an embodiment of the leading edge device illustrating a skin assembly comprising upper and lower skins interconnected by a leading edge skin segment and a rib having a locking mechanism for engaging a nose linkage.

Referring to FIG. 7, shown is a perspective illustration of the leading edge device 52 mounted to the forward spar 46 of the main wing structure 26 of the wing 22. The aft end 74 of the upper leading edge wing skin 70 may be connected to the upper main wing skin 32 at an aft upper skin joint 110. In the embodiment shown, the aft end 74 of the upper leading edge wing skin 70 may be disposed in abutting contact with the forward end of the upper main wing skin 32 to provide a continuous outer mold line 40 (FIG. 3) of the wing upper surface 42. The aft end 74 of the upper leading edge wing skin 70 may be attached to the main spar such as by using mechanical fasteners 120 such as rivets installed in a fastener pattern 122 such as the staggered arrangement 124 shown in FIG. 7. The staggered arrangement 124 may accommodate flexing or bending of the upper leading edge wing skin 70 during deployment of the leading edge device 52. The upper main wing skin 32 may be attached to the forward spar 46 by means of mechanical fasteners 120. A single row of fasteners 120 may be installed for the attachment of the upper main wing skin 32 to the main spar due to lack of significant bending loads in the upper main wing skin 32.

It should be noted that the arrangement shown in FIG. 7 is not to be construed as limiting alternative arrangements for fastening the upper leading edge wing skin 70 and/or the upper main wing skin 32 to the wing 22. In this regard, it is contemplated that the upper leading edge wing skin 70 may be attached to alternative structure and is not limited to fastening the upper leading edge wing skin 70 to the forward spar 46. For example, the upper leading edge wing skin 70 may be fastened to the aft end (not shown) of one or more of the ribs 126 of the leading edge device 52. Furthermore, the attachment of the upper leading edge wing skin 70 to the upper main wing skin 32 is not limited to a butt joint but may comprise an overlapping joint (not shown) wherein the upper leading edge wing skin 70 at least partially overlaps the aft end of the upper main wing skin 32.

Figure 9:
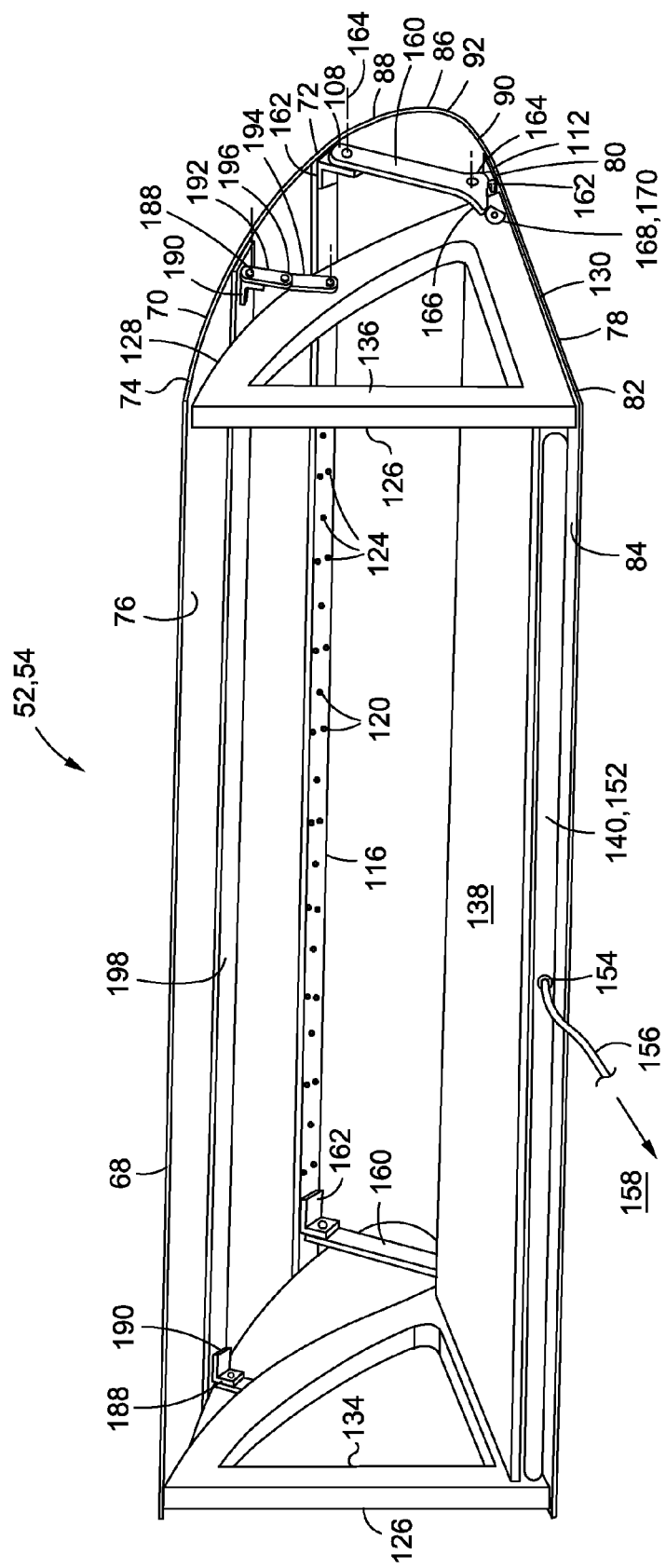
FIG. 9 is a further perspective view of an embodiment of a leading edge device illustrating an upper splice for connecting a portion of the leading edge skin segment to the upper skin and further illustrating a spanwise stiffener for the upper skin.

In FIGS. 7 and 9, the forward end 72 of the upper leading edge wing skin 70 may be connected to the segment upper end 88 of the leading edge skin segment 86 at a forward upper skin joint 108 by means of an upper splice 116 best shown in FIG. 9. The upper splice 116 may be mounted on an interior surface of the upper leading edge wing skin 70 and the segment upper end 88 of the leading edge skin segment 86 in a butt joint arrangement. In the embodiment shown in FIG. 7, a double row of fasteners 120 may be installed in a staggered arrangement 124 although other fastener arrangements may be implemented. Although shown as having a generally planar configuration, the upper splice 116 may be configured to function as a spanwise stiffener 198 for the upper leading edge wing skin 70. In an embodiment, the upper splice 116 may include one or more a spanwise flanges (not shown) extending outwardly (e.g., downwardly) from the upper splice 116 to increase the stiffness of the upper splice 116. In this manner, the upper splice 116 may increase the stiffness and reduce deflection or bowing in the upper leading edge wing skin 70.

FIGS. 3 and 9 illustrate a knee linkage 188 that may optionally be included with the leading edge device 52 to provide support for the upper leading edge wing skin 70 such as when the leading edge device 52 is in the undeployed position 54 and the upper leading edge wing skin 70 is spaced above the rib upper surfaces 128. As shown in FIG. 3, one or more of the knee linkages 188 may be coupled between the upper leading edge wing skin 70 and one of the ribs 126. The knee linkage 188 may include a lower link 194 coupled to an upper link 192. The lower link 194 may be pivotally coupled to a rib 126. The upper link 192 may be pivotally coupled to the upper leading edge wing skin 70 by means of a knee linkage attach bracket 190. When the leading edge device 52 is in the undeployed position 54, the knee linkage 188 may be locked into position by inserting a pin (not shown) through a hole 196 at the coupling of the upper link 192 to the lower link 194. The pin may extend over the rib upper surface 128 such that a side of the pin is in contacting relation with the rib upper surface 128 such that downward movement of the pin is prevented. By preventing downward movement of the pin, downward movement of the upper leading edge wing skin 70 is prevented.

FIG. 9 illustrates one or more of the knee linkages 188 located on opposing sides of the upper leading edge wing skin 70. A spanwise stiffener 198 may optionally be mounted to the inner skin surface 76 of the upper leading edge wing skin 70 and may extend between the knee linkages 188 on the opposing sides of the upper leading edge wing skin 70. The spanwise stiffener 198 may be formed of a material that is compatible with the material of the upper leading edge wing skin 70. In an embodiment, the spanwise stiffener 198 may be formed of metallic and/or non-metallic material and may include a flange (not shown) extending downwardly from the spanwise stiffener 198 to increase the stiffness of the spanwise stiffener 198. The spanwise stiffener 198 may be attached to the upper leading edge wing skin 70 by mechanical fastening, by adhesively bonding, or by a combination thereof. The spanwise stiffener 198 may also be integrally formed with the upper leading edge wing skin 70. Advantageously, the knee linkages 188 and the spanwise stiffener 198 may provide improved stability and spanwise stiffness to the upper leading edge wing skin 70 and may increase the load-carrying capability of the upper leading edge wing skin 70 when the leading edge device 52 is in the undeployed position 54.

Referring again to FIG. 7, the segment upper end 88 of the leading edge skin segment 86 may be attached to the upper splice 116 by means of mechanical fasteners 120. The forward end 80 of the lower leading edge wing skin 78 may be connected to the segment lower end 90 of the leading edge skin segment 86 at a forward lower skin joint 112 using a lower splice 118 (FIG. 7) configured similar to the above-described upper splice 116. In addition, the lower splice 118 may facilitate attachment of the forward end 72 of the upper leading edge wing skin 70 to the segment upper end 88 of the leading edge skin segment 86. The aft end 82 of the lower leading edge wing skin 78 may be coupled to the lower main wing skin (not shown) at an aft lower skin joint 114 (FIG. 3) in a manner similar to that which is described for the coupling of the upper leading edge wing skin 70 to the upper main wing skin 32. Although the present disclosure describes the attachment of the upper and lower leading edge wing skins 70, 78 and the upper and lower main wing skin 32, 34 (FIG. 6) using mechanical fasteners 120, adhesive may be used as an alternative to or in combination with mechanical fasteners as appropriate considering bending stresses and peel forces during flexing of the upper and lower leading edge wing skins 70, 78.

In the present disclosure, the upper and lower leading edge wing skins 70, 78 (FIG. 7) may be formed of a material that provides a desired degree of stiffness to sustain flight loads and minimize vibrations or oscillations in the upper and lower leading edge wing skins 70, 78. For a commercial airliner, such flight loads may include aerodynamic loads or pressure loads imposed when the leading edge device 52 (FIG. 7) is undeployed and the aircraft 10 (FIG. 1) is at a cruising altitude (e.g., 35,000 feet) moving at a cruising airspeed (e.g., 500 mph). In addition, the upper and lower leading edge wing skins 70, 78 may be configured to provide suitable mechanical properties within a range of temperature extremes such as −60° F. at cruising altitude to 120° F. when landing at a low elevation airport in a hot climate. The flight loads may also include aerodynamic loads when the leading edge device 52 is deployed and the wing 22 (FIG. 7) is at a relatively high angle of attack. The cycle of moving the upper and lower leading edge wing skins 70, 78 from the undeployed position 54 (FIG. 3) to the deployed position 56 (FIG. 3) and back again may typically occur at least two times during each flight cycle (e.g., ground-air-ground) such that the leading edge device 52 may be configured to endure tens of thousands of flight cycles over the operating life of the aircraft 10. In addition, the leading edge device 52 may be required to endure fatigue loads due to buffeting such as when the aircraft 10 encounters turbulence when the leading edge device 52 is in the undeployed position 54 (e.g., cruise) and/or in the deployed position 56 (e.g., approach/landing).

In FIG. 7, the upper and lower leading edge wing skins 70, 72 are preferably formed of resiliently flexible, non-stretchable material having an extended fatigue life and preferably providing a desired degree of resistance to flexing without plastic deformation. Such resistance to flexing in the upper and lower leading edge wing skins 70, 78 may advantageously cause the skin assembly 68 of the leading edge device 52 to passively bias or urge the leading edge device 52 from the deployed position 56 (FIG. 3) back toward the undeployed position 54. In an embodiment, the upper and lower leading edge wing skins 70, 78 may be formed of laminated plies of fiber-reinforced polymeric material. For example, the upper and lower leading edge wing skins 70, 78 may be formed of a suitable thermosetting or thermoplastic resin such as an epoxy resin and may include suitable fibers such as E-glass or S-glass fibers or fibers formed of graphite, carbon, boron, or other fiber materials, without limitation. In the composite ply stackup, the fiber orientation, the ply quantity, and the ply thickness may be tailored for each one of the upper and lower leading edge wing skins 70, 78 to achieve the desired flexing and stiffness characteristics.

The upper and lower leading edge wing skins 70, 78 are not limited to being formed as a composite panel of laminated plies but may be formed as a composite sandwich panel having inner and outer face sheets (not shown) separated by a core (not shown) and configured to provide the desired degree of flexibility and stiffness. Furthermore, although the present disclosure contemplates the use of composite material for the upper and lower leading edge wing skins 70, 78, the upper and lower leading edge wing skins 70, 78 may also optionally be formed of metallic material or a combination of metallic and non-metallic materials. Further in this regard, different materials may be used at different locations within a given upper leading edge wing skin 70 or a given lower leading edge wing skin 78. The upper and lower splices 116, 118 may be formed of a material similar to the material used for forming the upper and lower leading edge wing skins 70, 78. However, the upper and lower splice 116, 118 may be formed of any material in any thickness and may include the use of metallic material and/or nonmetallic material. The upper and lower leading edge wing skins 70, 78 may be configured to have a skin thickness that may be tailored along the chordwise direction of the skin to achieve the desired bending or flexing characteristics. The stiffness of the upper and lower leading edge wing skins 70, 78 may be different in the spanwise direction relative to the stiffness in the chordwise direction.

In FIG. 7, the leading edge skin segment 86 may be formed of a material having a relatively high degree of durability and being configured to undergo a relatively large quantity of cycles of rolling motion without plastic deformation during morphing of the leading edge skin segment 86 when the leading edge device 52 moves between the undeployed and deployed position 54, 56 as described above with regard to FIGS. 4-6. In the embodiment shown in FIG. 7, a nose linkage 160 may be included with the leading edge skin segment 86 to act as a pin-ended joint between the upper and segment lower end 88, 90 of the leading edge skin segment 86 as described in greater detail below. The nose linkage 160 may limit the loads imposed on the leading edge skin segment 86 to aerodynamic pressure loads and/or loads due to the rolling motion of the leading edge skin segment 86. In an embodiment, the leading edge skin segment 86 may be formed of a thermoplastic polyamide material such as Nylon™, commercially available from E.I. du Pont de Nemours, Inc. In this regard, the leading edge skin segment 86 may be formed of any material having mechanical properties approximately similar to one or more of the properties of thermoplastic polyamide material such as Nylon™. However, the leading edge skin segment 86 may be formed of a variety of different materials and is not limited to materials such as Nylon™. For example, the leading edge skin segment 86 may be formed of any one of a variety of polymeric materials such as polyethylene or other polymeric materials. Furthermore, it is contemplated that the leading edge skin segment 86 may be formed of metallic material or a combination of metallic and non-metallic material.

Figure 10:
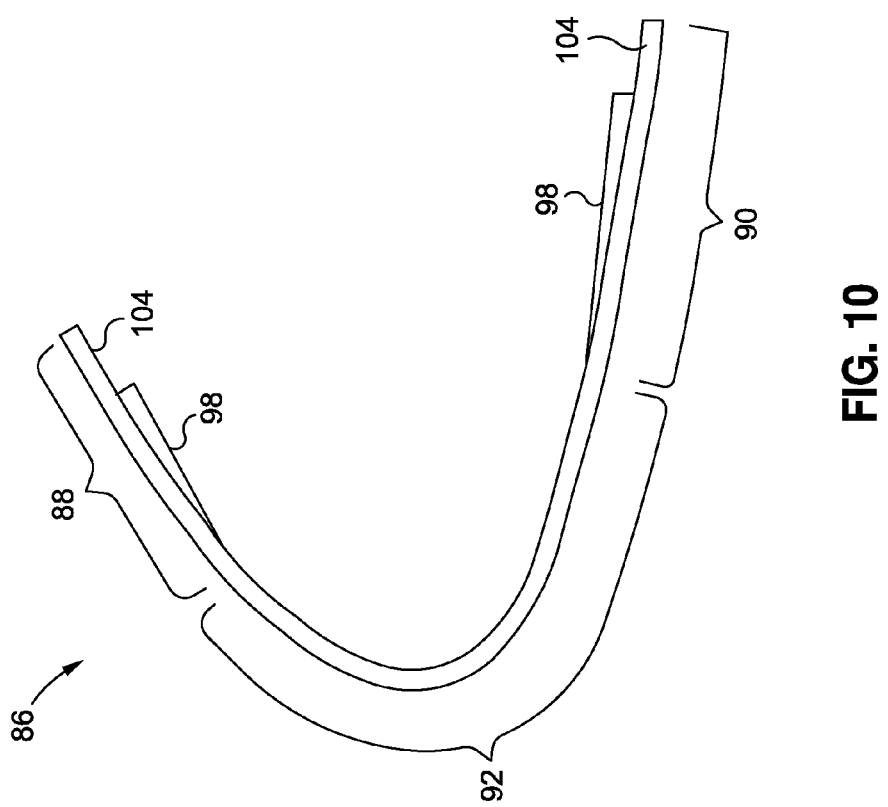
FIG. 10 is a cross-sectional view of the leading edge skin segment.

In FIGS. 10-13, shown are embodiments of the leading edge skin segment 86 having different thickness profiles. FIG. 10 illustrates the leading edge skin segment 86 in the installed condition wherein the leading edge skin segment 86 is in a curved shape when the leading edge skin segment 86 is coupled to the upper and lower leading edge wing skins 70, 78 (FIG. 7). The leading edge skin segment 86 may include a notch or relief 104 located at the free ends of the upper and segment lower end 88, 90 for attachment of the leading edge skin segment 86 to the upper and lower splice 116, 118 (FIG. 7) and/or nose linkage attach brackets 162 (FIG. 9). As can be seen in FIG. 10, the leading edge skin segment 86 may include the upper and segment lower end 88, 90 separated by an intermediate portion 92. The thickness of the leading edge skin segment 86 may be tailored to provide the desired strength, durability, and morphing characteristics for the leading edge skin segment 86 when the leading edge device 52 (FIG. 7) is moved between the undeployed and deployed position 54, 56 (FIG. 3). The leading edge skin segment 86 may be provided with a relatively thin cross section in the intermediate portion 92 between the upper and segment lower end 88, 90 and a relatively thick cross section at the segment upper and segment lower ends 88, 90. The thickness profile of the leading edge skin segment 86 may be tailored such that the leading edge skin segment 86 assumes the desired curved shape in both the undeployed position 54 and in the deployed position 56 as discussed below.

FIGS. 11-13 illustrate the leading edge skin segment 86 in an initial planar shape prior to bending the leading edge skin segment 86 into a curved shape (FIG. 10) for attachment to the upper and lower leading edge wing skins 70, 78 (FIG. 7). FIG. 11 illustrates the leading edge skin segment 86 having a relatively thick constant section 94 thickness at the upper and segment lower end 88, 90 and stepping down to a relatively thin intermediate section thickness 102 between the upper and segment lower end 88, 90. FIG. 12 illustrates the leading edge skin segment 86 having a stepped section 96 for transitioning from the relatively thick constant section 94 thickness to the relatively thin intermediate section thickness 102. By providing the stepped section 96, flat spots may be minimized or eliminated from the curved shape of the leading edge skin segment 86 when installed in the leading edge device 52 (FIG. 7). FIG. 13 illustrates the leading edge skin segment 86 having a tapered section 98 between each one of the constant section 94 thicknesses and the intermediate section thickness 102. As may be appreciated, the thickness profile including the length of the constant thickness sections 100 and the intermediate thickness section 102 may be tailored to provide the desired morphing capability for the leading edge skin segment 86 so that the leading edge skin segment 86 may assume the desired shape of the leading edge 28 in both the deployed position 56 (FIG. 3) and in the undeployed position 54 (FIG. 3).

Figure 14:
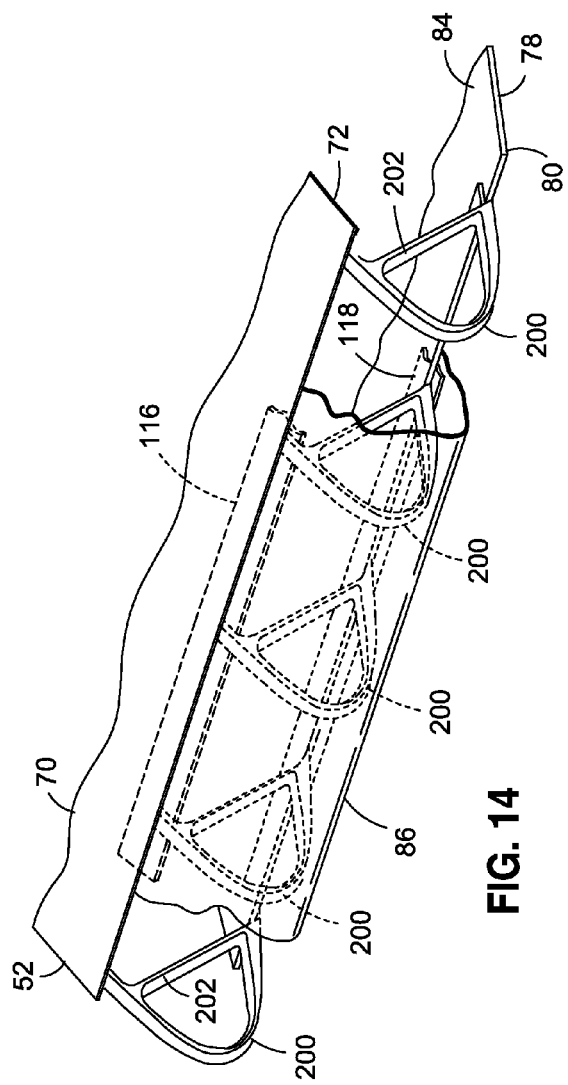
FIG. 14 is a perspective illustration of a portion of the leading edge device having a plurality of nose supports optionally installed within the leading edge skin segment.
Figure 15:
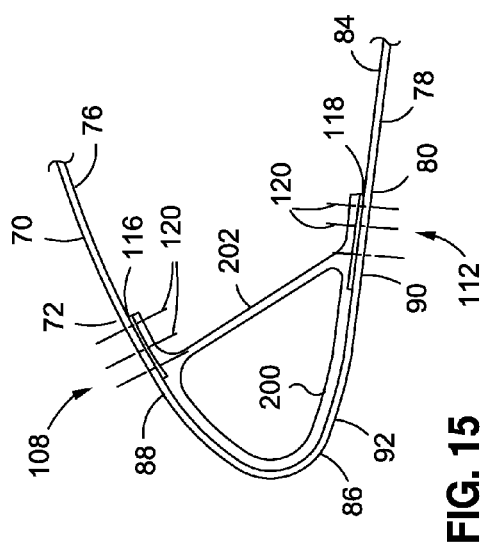
FIG. 15 is a cross-sectional view of a nose support attached to the leading edge skin segment.

FIGS. 14-15 illustrate optional nose supports 200 that may be included with the leading edge skin segment 86. In the embodiment shown, the nose supports 200 may be configured complementary to an inner surface of the leading edge skin segment 86. The leading edge skin segment 86 may include one or more of the nose supports 200 which may be spaced along a length of the leading edge skin segment 86. The nose supports 200 may be mechanically or adhesively attached to the upper and lower splice 116, 118 and/or to the forward end 72, 80 of the upper and lower leading edge wing skins 70, 78. The nose supports 200 may support the leading edge skin segment 86 in the desired shape and may prevent outward bowing of the leading edge skin segment 86 and outward bowing of the forward end 72, 80 of the upper and lower leading edge wing skins 70, 78. The nose supports 200 may facilitate flexing of the leading edge skin segment 86 to aid in the rolling motion thereof. In this regard, the nose supports 200 may include a brace 202 as shown which may minimize tension loads in the leading edge skin segment 86 which may result from flexing of the upper and lower leading edge wing skin 70, 78. The braces 202 of the nose supports 200 may transfer the flexing motion (e.g., bending loads) from the lower leading edge wing skin 78 through the braces 202 and into the upper leading edge wing skin 78. By minimizing or reducing the need for the leading edge skin segment 86 to carry tension loads, the leading edge skin segment 86 may be provided in a reduced thickness which may allow the leading edge skin segment 86 to more readily assume a desired radius of curvature as the leading edge 28 moves between the undeployed and deployed position 54, 56.

Figure 8:
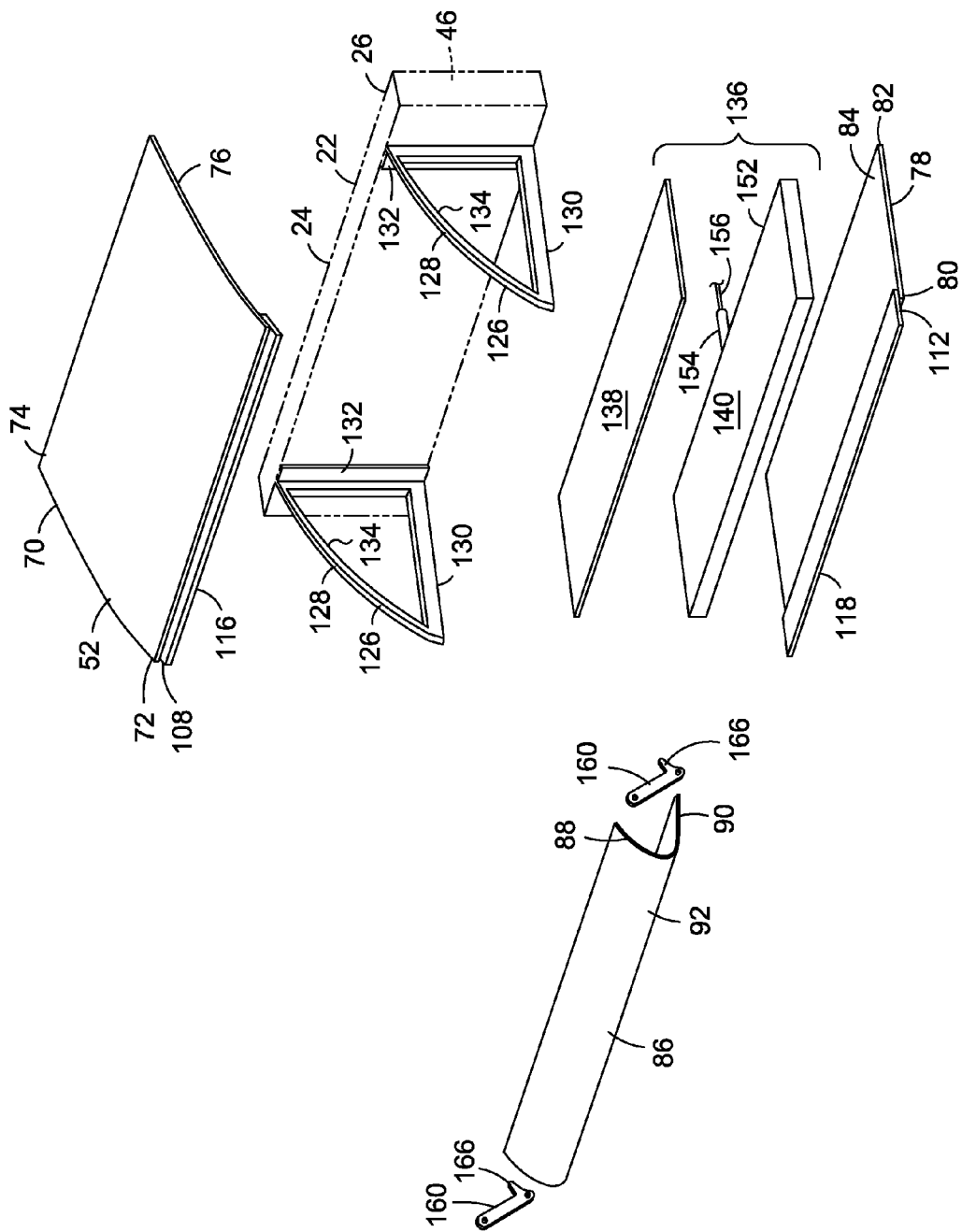
FIG. 8 is an exploded perspective view of an embodiment of the leading edge device of FIG. 7.

Referring to FIGS. 7-8, the leading edge device 52 may include one or more ribs 126 that may be attached or mounted to the main wing structure 26 of the wing 22 such as to the forward spar 46. In the embodiment shown, a pair of the ribs 126 may be mounted to the forward spar 46 in spaced relation to one other. However, any number of ribs 126 may be provided. The ribs 126 are shown as extending generally perpendicularly from the forward spar 46. However, the ribs 126 may be oriented in any direction relative to the forward spar 46. In an embodiment, mechanical fasteners 120 may be extended through rib flanges 132 and into the forward spar 46 to attach the ribs 126 to the main wing structure 26 of the wing 22. However, the ribs 126 may be provided in a variety of different configurations and are not limited to being formed as discrete ribs 126 attached to the forward spar 46. For example, the ribs 126 may comprise an extension of one or more main ribs (not shown) extending forwardly from the main wing structure 26 of the wing 22.

In FIGS. 7-8, each rib 126 may have a rib upper surface 128 and a rib lower surface 130. The rib upper surface 128 may define a shape of the upper leading edge wing skin 70 when the skin assembly 68 is in the deployed position 56 (FIG. 3). The rib lower surface 130 may define a shape of the lower leading edge wing skin 78 when the skin assembly 68 is in the undeployed position 54 (FIG. 3) and the inner skin surface 84 of the lower leading edge wing skin 78 is in contact with the rib lower surface 130. In this regard, the rib lower surface 130 may be provided with a shape that allows the lower leading edge wing skin 78 to function as an extension of the wing lower surface 44. The ribs 126 may include cutouts 134 to reduce weight of the leading edge device 52. In addition, the cutouts 134 may accommodate the routing of systems (not shown—e.g., electrical wiring, hydraulic lines, pneumatic lines, etc.) along an interior (not shown) of the wing 22 leading edge 28. The ribs 126 may be formed of a suitable material such as aluminum or any other metallic material. However, the ribs 126 may also be formed of nonmetallic material such as composite material or a combination of metallic and nonmetallic material. In the embodiment shown, the upper and lower leading edge wing skins 70, 78 may extend between and at least partially overlap the respective rib upper surface 128 and rib lower surface 130 such that the upper and lower leading edge wing skins 70, 78 may bear against the respective rib 126 upper and lower surface 128, 130 when the leading edge device 52 is in the respective undeployed and deployed position 54, 56.

In FIG. 7-9, the leading edge device 52 (FIG. 7) may include a substantially rigid nose linkage 160 for movably coupling the upper and segment lower end 88, 90 of the leading edge skin segment 86. In the embodiment shown, each end of the nose linkage 160 (FIG. 7) may be movably coupled to the respective upper and lower splices 116, 118 and/or to the upper and segment lower end 88, 90 of the leading edge skin segment 86 by means of a nose linkage attach bracket 162 (FIG. 9). Each nose linkage attach bracket 162 (FIG. 9) may include a pivot joint 164 (FIG. 7) for pivotably coupling the nose linkage 160 to the upper and segment lower end 88, 90 of the leading edge skin segment 86 and/or the upper and lower splice 116, 118. As indicated above, the nose linkage 160 may limit loads in the leading edge skin segment 86 to aerodynamic pressure loads and/or loads due to rolling motion as the leading edge device 52 moves between the undeployed position 54 (FIG. 3) and the deployed position 56 (FIG. 3). The nose linkage 160 minimizes or eliminates tension loads in the leading edge skin segment 86 as may result from flexing of the upper and lower leading edge wing skin 70, 78. In this regard, the nose linkage 160 may facilitate flexing of the upper leading edge wing skin 70 by transferring the flexing motion of the lower leading edge wing skin 78 through the nose linkage 160 and into the upper leading edge wing skin 78. Advantageously, the nose linkage 160 allows for a reduced thickness of the intermediate portion 92 of the leading edge skin segment 86 which allows the leading edge skin segment 86 to better assume a desired radius of curvature of the wing 22 leading edge 28 when the leading edge device 52 is in the undeployed and deployed positions 54, 56.

FIGS. 7 and 9 further illustrate a locking mechanism 168 that may be incorporated into the leading edge device 52. The locking mechanism 168 may be configured to lock the skin assembly 68 in the undeployed position 54 (FIG. 3) such as when the upper leading edge wing skin 70 is in contact with the rib lower surface 130. In the embodiment shown, the locking mechanism 168 may comprise a locking cam 170 that may be mounted to a cam actuator 180 (FIG. 7). The cam actuator 180 may be mounted to one or more of the ribs 126 and may be configured to rotate the locking cam 170 into engagement with a locking arm 166 of the nose linkage 160. As indicated above, the locking mechanism 168 may maintain the inner skin surface 84 of the lower leading edge wing skin 78 into a fully undeployed position against the rib lower surface 130.

Referring to FIGS. 20-21, shown is an embodiment of the locking mechanism 168 comprising the locking cam 170 configured to be rotatably engaged with the locking arm 166 of the nose linkage 160. In FIG. 20, the locking cam 170 may include a flat locking section 174 configured to engage an underside of the locking arm 166 when the leading edge device 52 is in the undeployed position 54 (FIG. 3). The locking cam 170 may include a constant radius section and a section of decreasing radius. The locking cam 170 may be pivotable about a rotation axis 172 of a cam actuator 180. The cam actuator 180 may comprise a servo 182 or other suitable electro-mechanical device or other device. Rotation of the locking cam 170 in a counterclockwise direction (shown in FIG. 20) toward an unlocked position 186 facilitates release of the leading edge device 52 from the undeployed position 54 when the cam edge rotates away from the locking arm 166 and allows the leading edge device 52 to move downward (shown in FIG. 21) toward the deployed position 56 (FIG. 3).

In an embodiment, the cam actuator 180 may be manually activated. However, the leading edge device 52 may include a sensor (not shown) to sense the position of the leading edge device 52 in the undeployed position 54 (FIG. 3) such as when the lower leading edge wing skin 78 comes into contact with the rib lower surface 130 (FIG. 3). The sensor may send a signal to cause the activation of the cam actuator 180 and initiating clockwise rotation of the locking cam 170 into engagement with the locking arm 166 of the nose linkage 160. Advantageously, the positioning of the locking mechanism 168 at the forward end 80 of the lower leading edge wing skin 78 provides a failsafe mechanism for stabilizing the leading edge device 52 in the undeployed position 54. In addition, the locking mechanism 168 positively engages the lower leading edge wing skin 78 against the rib lower surfaces 130 to provide additional areas of contact for the lower leading edge wing skin 78 which may improve the load-carrying capability of the lower leading edge wing skin 78 and may minimize vibration in the lower leading edge wing skin 78.

Referring again to FIGS. 7-9, the leading edge device 52 may include a deployment device 136. In the embodiment shown, the deployment device 136 (FIG. 8) may be configured as an inflatable airbag 140. In an embodiment, the airbag 140 may be captured between an airbag support 138 that may be mounted in spaced relation to the lower leading edge wing skin 78. In an embodiment, the airbag support 138 may extend between the ribs 126 of the leading edge device 52. The airbag support 138 may be coupled to the ribs 126 and/or to the forward spar 46 or to other structure (not shown) associated with the main wing structure 26 of the wing 22. The airbag support 138 may extend between the forward spar 46 and the leading edge skin segment 86 (FIG. 3) and may be sized to contain or confine the airbag 140 to an area between the airbag support 138 and the lower leading edge wing skin 78. In an embodiment, the airbag support 138 may comprise a generally planar surface configured to resist the pressure of the inflating airbag 140. In a non-limiting embodiment, the airbag support 138 may be fabricated of a substantially rigid and/or stiff material such as metallic material (e.g., aluminum) or non-metallic material and may be formed of a mesh material (the not shown) and may optionally include spanwise or chordwise stiffeners (not shown).

Referring again to FIGS. 8-9, shown is an embodiment of the airbag 140 installed in the leading edge device 52 for applying pressure to the lower leading edge wing skin 78. As indicated above, the airbag 140 may be captured between the airbag support 138 and the inner skin surface 76 of the lower leading edge wing skin 78 as shown in FIG. 9. The airbag may be retained in position within the leading edge device 52 by means of adhesive, Velcro™, adhesive tape, or any suitable mechanical or non-mechanical fastening means for securing the airbag 140 to the airbag support 138 and/or to the lower leading edge wing skin 78. The airbag 140 may be configured to bear against an inner skin surface 76 of the lower leading edge wing skin 78 during inflation of the airbag 140 in a manner causing the skin assembly 68 to flex downwardly toward the deployed position 56 (FIG. 3). In FIGS. 8-9, the airbag 140 may include one or more pressurization hoses 156 extending outwardly from one or more valves 154 that may be mounted to the airbag 140. The pressurization hose(s) 156 may be connected to a pressurization source 158 (not shown) such as a dedicated pneumatic pump (not shown) or, alternatively, to an existing source of pressurized air from the aircraft 10.

Shown in FIGS. 16-19 is an embodiment of the airbag 140. FIG. 16 illustrates the airbag 140 in a deflated position 152. FIGS. 17-19 illustrate the airbag 140 in an inflated position 150. In the embodiment shown, the airbag 140 may be provided as a substantially continuous member extending along substantially the entire distance between the ribs 126 (FIG. 7) and extending substantially from the forward spar 46 (FIG. 7) of the main wing structure 26 (FIG. 7) of the wing 22 (FIG. 7) to the forward end 80 (FIG. 7) of the lower leading edge wing skin 78 (FIG. 7). Advantageously, by providing the airbag 140 to extend across substantially the entire area of the lower leading edge wing skin 78, a substantially uniform distribution of pressure may be applied across the lower leading edge wing skin 78 at a relatively low working pressure. Additionally, the airbag 140 provides a relatively low-weight and simple means for applying downward flexing force to the lower leading edge wing skin 78 in maintaining the skin assembly 68 (FIG. 7) in the deployed position 56 (FIG. 3) while sustaining flight loads.

In FIGS. 17-19, although the airbag 140 is shown having a single pressurization hose 156 extending from a single valve 154, any number of valves 154 and pressurization hoses 156 may be included in order to provide redundancy. In addition, although FIG. 19 illustrates the airbag 140 as having a single open cell of generally constant cross-section extending along a length of the airbag 140, the airbag 140 may be configured with a plurality of cells or the airbag 140 may be provided as a plurality of individual airbags (not shown). By providing a plurality of cells in the airbag 140, the leading edge device 52 (FIG. 7) may be operated as a flight control mechanism or as control surface for the wing 22 (FIG. 7) such as for controlling pitch, roll, and/or yaw of the aircraft 10 (FIG. 1). In this regard, a plurality of cells in the airbag 140 may provide a high degree of controllability of the leading edge device 52 to move the leading edge device to a desired deflection angle. In such an embodiment, the leading edge device 52 may be used in combination with other control surfaces of the wing 22 such as the ailerons for directional control of the aircraft 10.

Shown in FIG. 19 is a cross-sectional view of the airbag 140 illustrating an outer cover 142 containing an inner bladder 144. In the embodiment shown, the outer cover 142 may be formed in a generally triangular shape corresponding to the shape of the inflated airbag 140 when the leading edge device 52 is in the deployed position 56 as shown in FIG. 3. The outer cover 142 may be formed of durable fabric such as Nylon™ fabric and having sewn seams 146 and/or optional heat-sealed seams 146. The inner bladder 144 may be formed as an airtight chamber optionally including heat-sealed seams. Sealant may optionally be included in the inner bladder 144 to minimize leakage. The outer cover 142 and inner bladder 144 may be configured such that the airbag 140 may fully collapse and return to the deflated position 152 (FIG. 7) under pressure applied by the lower leading edge wing skin 78 (FIG. 7). The airbag 140 may preferably be configured to fully collapse to the deflated position 152 to an extent that allows the lower leading edge wing skin 78 to be placed in contact against the rib lower surface(s) 130 (FIG. 7). One or more reinforcing straps 148 may be included with the airbag 140 as shown in FIGS. 17-18 to facilitate collapse of the airbag 140 from the inflated position 150 to the deflated position 152.

Although the present disclosure describes the deployment device 136 (FIG. 16) as an airbag 140, the deployment device 136 may be configured in any one of a wide variety of configurations for providing downward pressure against the lower leading edge wing skin 78 (FIG. 7) to cause flexing of the lower leading edge wing skin 78. For example, the deployment device 136 may comprise an arrangement of one or more linear actuators distributed over the lower leading edge wing skin 78 for providing downward force against the lower leading edge wing skin 78. In another embodiment, it is contemplated that the actuators may be positioned along the forward end 80 of the lower leading edge wing skin 78 for providing downward force for flexing the lower leading edge wing skin 78 and deploying the leading edge device 52 (FIG. 7) into the deployed position 56. In a further embodiment, the deployment device 136 may be configured as one or more actuators (not shown) to provide a pulling force to pull the upper leading edge wing skin 70 (FIG. 7) from the undeployed position 54 (FIG. 3) downwardly toward the deployed position. The downward pulling force (not shown) that may be applied to the upper leading edge wing skin 70 may be transferred into the lower leading edge wing skin 78 through the nose linkage(s) 160 (FIG. 7). In any of the above-described embodiments, the deployment device 136 may be actuated by any one of a variety of means including, but not limited to, pneumatic, electro-mechanical, hydraulic, shape memory alloy, or any other means or combination thereof.

Figure 22:
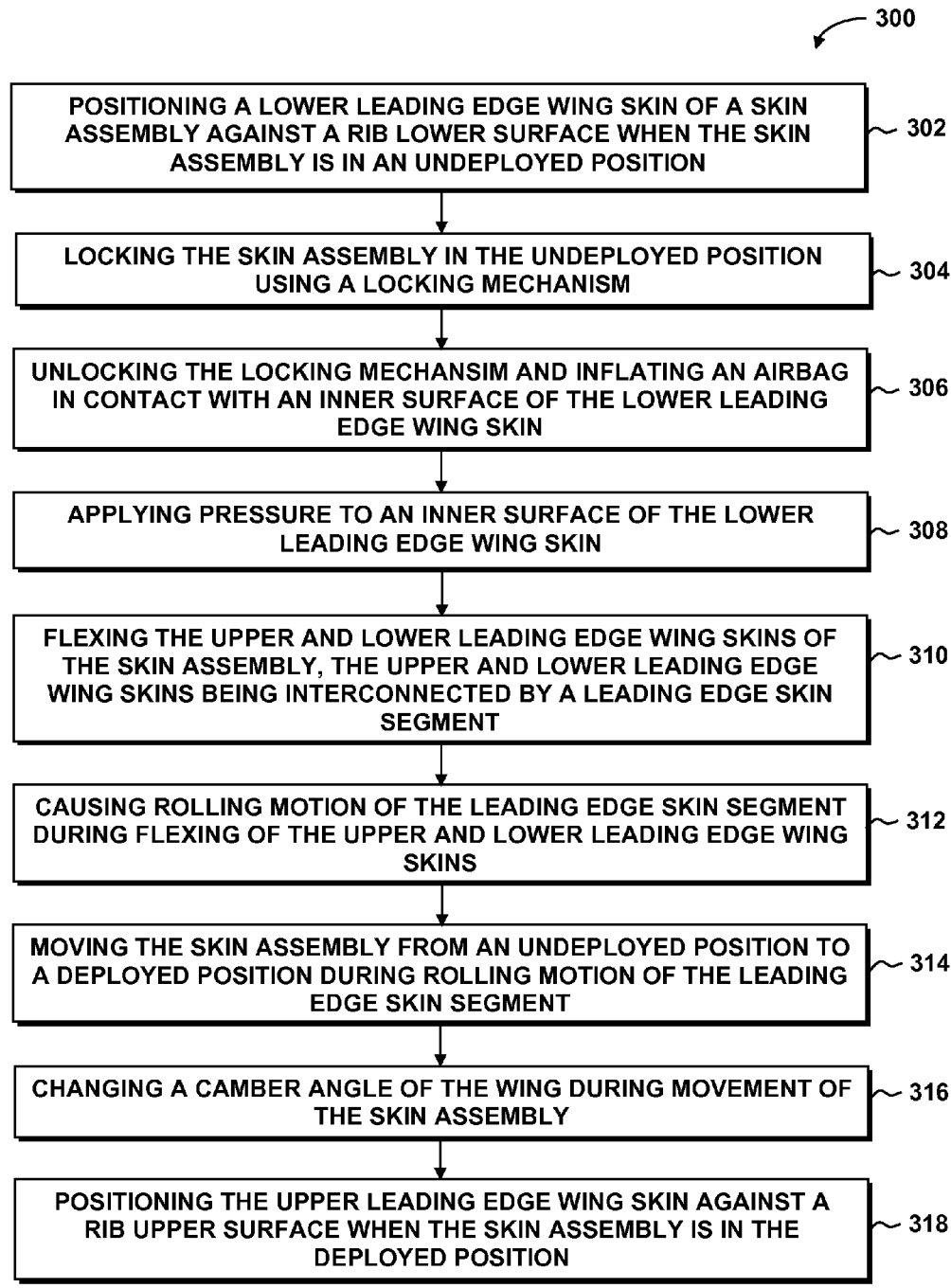
FIG. 22 is a flow chart illustrating one or more operations that may be included in a method for morphing a leading edge of an airfoil.

Referring to FIG. 22, shown is flow diagram illustrating a method 300 of morphing the leading edge 28 (FIG. 7) of an airfoil 24 (FIG. 7) such as the above-described aircraft 10 (FIG. 1) wing 22 (FIG. 1). The morphing of the leading edge 28 may include a rolling motion (FIGS. 4-6) of the leading edge skin segment 86 (FIG. 7) in combination with flexing of upper and lower leading edge wing skins 70, 78 (FIG. 7). Advantageously, the morphing of the leading edge device 52 (FIG. 7) results in a high degree of flow turning when the leading edge device 52 is in the deployed position 56 (FIG. 6). In addition, deployment of the leading edge device 52 occurs without gaps or sharp edges protruding from the leading edge device 52 which advantageously minimizes the generation of turbulence and/or aerodynamic noise. In this regard, the leading edge device 52 provides a substantially continuous outer mold line 40 (FIGS. 4-6) with the upper and lower main wing skins 32, 34 along the wing upper and lower surfaces 42, 44 as the skin assembly 68 is moved between the undeployed position 54 and the deployed position 56 as shown in FIGS. 4-6.

Step 302 of the method 300 of FIG. 22 may include initially positioning the inner skin surface 76 (FIG. 3) of the lower leading edge wing skin 78 (FIG. 3) in substantial contact with the rib lower surface 130 (FIG. 3) when the skin assembly 68 (FIG. 3) is in the undeployed position 54 as shown in FIG. 3. By positioning the lower leading edge wing skin 78 against the rib lower surface 130, the lower leading edge wing skin 78 may have additional areas of contact which may improve the load-carrying capability of the lower leading edge wing skin 78 and minimize vibration of the lower leading edge wing skin 78.

Step 304 of the method 300 of FIG. 22 may include locking the skin assembly 68 in the undeployed position 54 using a locking mechanism 168. In the embodiment shown in FIG. 20, the locking mechanism 168 may include the locking cam 170 mounted to the cam actuator 180 (FIG. 7) or other suitable device. The locking cam 170 may be rotated into locking engagement with the nose linkage 160 using the cam actuator 180 (FIG. 20). Although shown as including the locking cam 170, the locking mechanism 168 may be configured as any mechanism that places the lower leading edge wing skin 78 into positive contact with one or more of the rib lower surfaces 130 (FIG. 7) of the leading edge device 52.

Step 306 of the method 300 of FIG. 22 may include unlocking the locking mechanism 168 (FIG. 21) and activating a deployment device 136 (FIG. 19) for moving the skin assembly 68 (FIG. 21) from the undeployed position 54 (FIG. 3) to the deployed position 56 (FIG. 3). In an embodiment, the deployment device 136 may comprise the airbag 140 as described above and which may be inflated by means of a pressurized air source fluidly coupled to the airbag 140 shown in FIG. 9. The airbag 140 may be confined between the airbag support 138 (FIG. 9) and the lower leading edge wing skin 78 (FIG. 9).

Step 308 of the method 300 of FIG. 22 may include operating the deployment device 54 (e.g., the airbag 140) by applying pressure to the inner surface of the lower leading edge wing skin 78 (FIG. 3) during inflation of the airbag 140. As shown in FIG. 3, pressurized air may be provided to the airbag 140 causing the airbag 140 to inflate from a deflated position 152 (FIG. 3—shown in solid) to an inflated position 150 (FIG. 3—shown in phantom).

Step 310 of the method 300 of FIG. 22 may include flexing the upper and lower leading edge wing skins 70, 78 (FIG. 3) of the skin assembly 68. As described above, the skin assembly 68 may include the upper and lower leading edge wing skins 70, 78 interconnected by the leading edge skin segment 86 (FIG. 7) and the nose linkage 160. As indicated above, flexing or bending of the upper leading edge wing skin 70 may be facilitated by the nose linkage 160 which may transfer tension loads from the lower leading edge wing skin 78, through the nose linage 160, and into the upper leading edge wing skin 70. The aft end 74, 82 of each one of the upper and lower leading edge wing skins 70, 78 may be fixedly coupled to the main wing structure 26 (FIG. 7) of the wing 22 such as to the forward spar 46 with the remainder of each one of the upper and lower leading edge wing skins 70, 78 extending outwardly in a cantilevered manner and being coupled by the leading edge skin segment 86.

Step 312 of the method 300 of FIG. 22 may include causing rolling motion of the leading edge skin segment 86 during flexing of the upper and lower leading edge wing skins 70, 78. As shown in FIGS. 4-6 and described above, rolling motion of the leading edge skin segment 86 may be characterized by movement of the first and second reference points 66*a*, 66*b* (FIG. 3) along the surface of the leading edge skin segment 86 between the upper and lower ends 88, 90 as the skin assembly 68 is moved between the undeployed position 54 and the deployed position 56 as described above.

Step 314 of the method 300 of FIG. 22 may include moving the skin assembly 68 from an undeployed position 54 to a deployed position 56 during rolling motion of the leading edge skin segment 86. FIG. 4 illustrates the leading edge device 52 and the undeployed position 54. FIG. 6 illustrates the leading edge device 52 in the deployed position 56. FIG. 5 illustrates the leading edge device 52 in an intermediate position 58. In this regard, the leading edge device 52 disclosed herein is not limited to deployment in one of the two leading edge positions, namely, the undeployed position 54 and the deployed position 56. Deployment of the leading edge device 52 may include intermediate positions 58 (e.g., FIG. 5) as may be required during different stages of flight. For example, during the approach phase of a flight, an aircraft 10 may deploy the leading edge device 52 in progressively greater amounts as the aircraft 10 gets closer to the airport and the angle of attack of the wings 22 increases and/or the relative airspeed of the aircraft 10 decreases.

Step 316 of the method 300 of FIG. 22 may include changing a camber angle 64 of the airfoil 24 during movement of the skin assembly 68. As shown in FIG. 6, the leading edge device 52 defines a deployed camber line 60. The deployed camber line 60 defines a camber angle 64 relative to the undeployed camber line 62 of the undeployed skin assembly 68. In an embodiment, the leading edge device 52 may be configured to provide an increase in camber angle 64 (FIG. 6) of at least approximately 20° relative to the camber line 62 of the leading edge device 52 in the undeployed position 54.

Step 318 of the method 300 of FIG. 22 may include positioning the inner skin surface 76 of the upper leading edge wing skin 70 substantially against the rib upper surface 128 (FIG. 3) when the skin assembly 68 is in the deployed position 56 as shown in FIG. 3. When the skin assembly 68 contacts the rib upper surface 128 of one or more ribs 126, the upper leading edge wing skin 70 may substantially assume the shape of the rib upper surface 128(s). Advantageously, the rib upper surface 128 may provide stability to the upper leading edge wing skin 70 against vibration.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A wing having a morphing leading edge, comprising:
a flexible leading edge skin segment having segment ends positioned adjacent to upper and lower leading edge wing skins to form a skin assembly, the upper leading edge wing skin being positioned between the leading edge skin segment and an upper main wing skin, the lower leading edge wing skin being positioned between the leading edge skin segment and a lower main wing skin; and
a deployment device configured to cause the upper and lower leading edge wing skin to move between an undeployed position and a deployed position;
at least one rib mounted to a main wing structure and having a rib upper surface and/or a rib lower surface;

the upper leading edge wing skin being placed into contact with the rib upper surface when the skin assembly is in the deployed position; and the lower leading edge wing skin being placed into contact with the rib lower surface when the skin assembly is in the undeployed position.

2. The wing of claim 1 further comprising:

the deployment device configured to flex the upper and lower leading edge wing skins thereby causing the leading edge skin segment to exhibit a rolling motion.

3. The wing of claim 1 wherein:

the upper and lower leading edge wing skins are positioned adjacent to a main wing structure.

4. The leading edge device of claim 1 further comprising:

a nose linkage interconnecting the segment upper and segment lower ends of the flexible leading edge skin segment.

5. The wing of claim 4 further comprising:

a cam configured to be rotated into engagement with the nose linkage and lock the skin assembly in an undeployed position.

6. The wing of claim 1 wherein the deployment device comprises:

an inflatable airbag captured between an airbag support and the lower leading edge wing skin for deploying the skin assembly; and the airbag being configured to bear against the lower leading edge wing skin during inflation of the airbag.

7. The wing of claim 1 wherein:

at least one of the upper and lower leading edge wing skins being configured to bias the skin assembly toward an undeployed position.

8. The wing of claim 1 further comprising:

at least one spanwise stiffener mounted to at least one of the upper and lower leading edge wing skins.

9. The wing of claim 1 wherein:

the leading edge skin segment is formed of a thermoplastic polyamide material.

10. The wing of claim 1 wherein:

the upper and lower leading edge wing skins are formed of fiber-reinforced polymeric material.

11. The wing of claim 1 wherein:

the wing has an increase in camber of at least approximately 20 degrees when the skin assembly is in a deployed position.

12. The wing of claim 1 wherein:

the wing has a continuous outer mold line along a wing surface as the skin assembly is moved between an undeployed position and a deployed position.

13. A wing, comprising:

at least two ribs mounted to a main wing structure in spaced relation to one other, each rib having a rib upper surface and a rib lower surface;

a skin assembly, including:

a flexible upper and lower leading edge wing skin each having a forward end and an aft end, the aft ends being fixedly coupled to the main wing structure; and a flexible leading edge skin segment interconnecting the upper and lower leading edge wing skins; and a deployment device configured to flex the upper and lower leading edge wing skins and cause rolling motion of the leading edge skin segment to move the skin assembly from an undeployed position toward a deployed position in a manner increasing a camber of the wing;

the lower leading edge wing skin being substantially in contact with the rib lower surface when the skin assembly is in the undeployed position; and the upper leading edge wing skin being substantially in contact with the rib upper surface when the skin assembly is in the deployed position.

14. A method of morphing a leading edge of a wing, comprising the steps of:

operating a deployment device positioned between a skin assembly and a main wing structure, the main wing structure having at least one rib mounted to the main wing structure, the rib having a rib lower surface and a rib upper surface;

causing an upper and lower leading edge wing skin of the skin assembly to flex and move between an undeployed position and a deployed position;

changing a camber angle of the wing during movement of the skin assembly;

positioning the lower leading edge wing skin substantially in contact with the rib lower surface when the skin assembly is in the undeployed position; and positioning the upper leading edge wing skin substantially in contact with the rib upper surface when the skin assembly is in the deployed position.

15. The method of claim 14 further comprising the steps of:

causing a leading edge skin segment of the skin assembly to exhibit a rolling motion during movement of the skin assembly.

16. The method of claim 14 further comprising the steps of:

mounting at least one rib to the main wing structure, the rib having a rib lower surface; and positioning the lower leading edge wing skin substantially in contact with the rib lower surface when the skin assembly is in the undeployed position.

17. The method of claim 14 further comprising the steps of:

mounting at least one rib to the main wing structure, the rib having a rib upper surface; and positioning the upper leading edge wing skin substantially in contact with the rib upper surface when the skin assembly is in the deployed position.

18. The method of claim 14 further comprising the step of:

interconnecting upper and lower ends of the leading edge skin segment using a substantially rigid nose linkage.

19. The method of claim 14 further comprising the step of:

locking the skin assembly in the deployed position using a locking mechanism.

20. The method of claim 14 wherein the step of operating the deployment device comprises:

inflating an airbag in contact with a skin inner surface of the lower leading edge wing skin; and applying pressure to the skin inner surface during inflation of the airbag.

* * * * *